Dec. 26, 1967 J. D. MITCHELL ET AL 3,359,650

PEANUT DRYER CONNECTOR

Filed Aug. 19, 1965 2 Sheets-Sheet 1

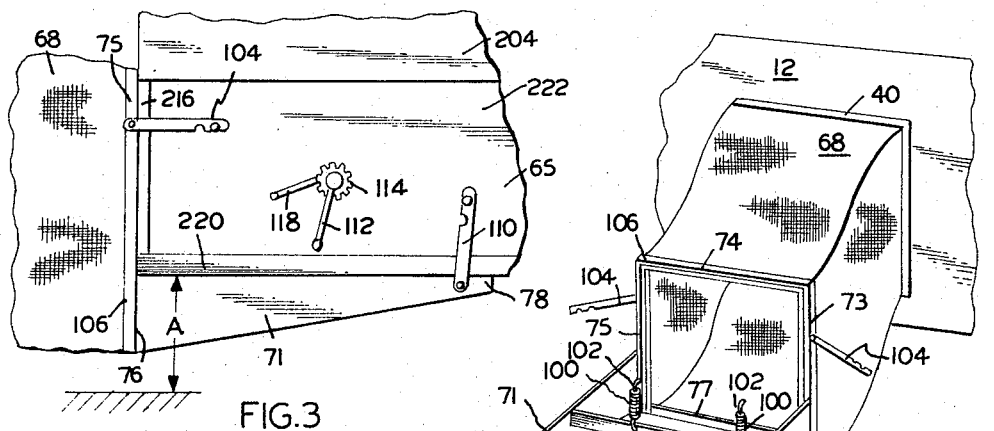
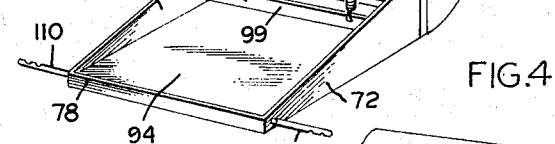
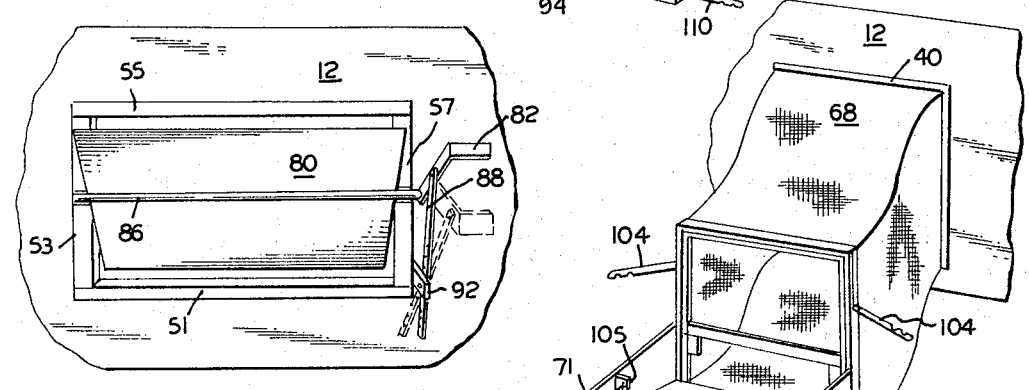
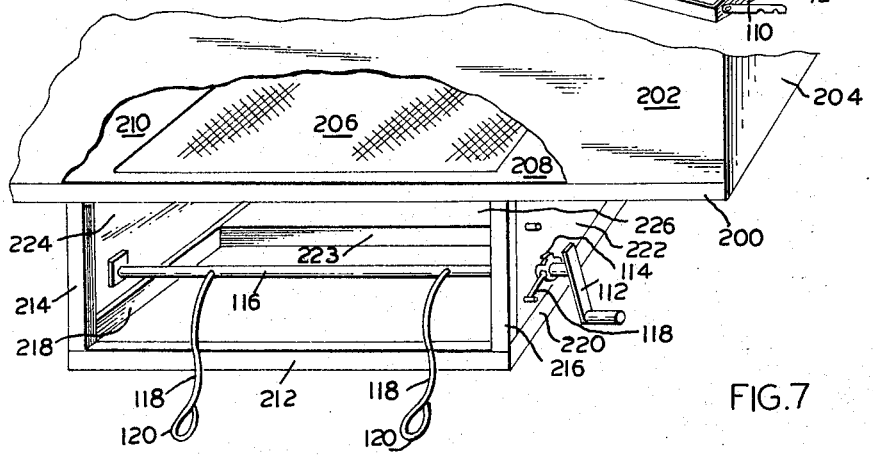

United States Patent Office 3,359,650
Patented Dec. 26, 1967

3,359,650
PEANUT DRYER CONNECTOR
John D. Mitchell and William R. Hall, Woodville, N.C., assignors to Harrington Manufacturing Company, Lewiston, N.C., a corporation of North Carolina
Filed Aug. 19, 1965, Ser. No. 481,127
5 Claims. (Cl. 34—214)

ABSTRACT OF THE DISCLOSURE

The present invention relates to a novel drying apparatus for peanuts and the like and, in particular, to novel means for connecting a source of drying gases to a container for the peanuts.

---

This invention generally pertains to a novel drying apparatus for peanuts and other farm crops such as corn, hay and small grains.

When a peanut farmer harvests his crop, he uproots the vines and the peanuts attached to the roots, allows the uprooted vinces and attached peanuts to remain in the sun a few days and then separates the dried vines and roots from the peanuts. However, the resulting peanuts have quite a high moisture content (20–30%) and this moisture content must be quickly reduced to less than 10% before the peanuts can either be sold to a peanut buyer in order to avoid the danger of mildew and spoilage.

Some peanut farmers buy their own drying equipment, but many farmers utilize the services of independent contractors for an agreed upon price per pound.

The most common type of drying equipment consist of motor-fan unit, a main plenum chamber and a plurality of portable drying bins or trailers attached to the main plenum chamber. A multi-blade fan usually blows heated or unheated air through the plenum chamber and then outwardly through each of the connected trailers.

With such drying systems there is a continuing desire for means to speed up the drying operation so that the farmer can dry his entire crop before rain arrives or so that the farmer can get his crop to market more quickly or so that the independent drying contarctor can service more farmers during the harvesting season.

It is therefore a primary object of this invention to provide drying apparatus wherein transportable bins of the size previously used in the art can be filled with wet peanuts and dried in a shorter time than was previously possible.

Finally, an object of the present invention is to provide a completely transportable drying system which has all the advantages of being a flexible mobile unit and has the ability to provide a large volume of air to dry a crop in a shorter period of time and at a lower cost than has heretofore been possible.

Other objects and advantages of the transportable dryer system will become apparent to one skilled in the art after reading the following description in conjunction with the accompanying drawings, wherein:

FIGURES 3 and 4 are fragmentary side and perspective views respectively of the flexible duct and attached connector means;

FIGURE 5 is a slightly modified embodiment of the apparatus illustrated in FIGURE 4;

FIGURE 6 is an enlarged frontal view of an outlet on the exterior surface of the main plenum chamber; and FIGURE 7 is a partial perspective view of the rear end of a mobile drying bin.

Considered from one aspect, the present invention involves:

(a) A main plenum chamber, (b) Said main plenum chamber having an inlet for introducing air under pressure, (c) Said main plenum chamber also having a plurality of plenum outlets for air, (d) At least one mobile drying bin positioned adjacent to at least one of said plenum outlets, each said drying bin having a floor that is at least partially perforated, (e) Each drying bin having a generally tubular air passageway that is permanently located entirely beneath the perforated bottom of the drying bin, (f) The top of said tubular air passageway being in open communication with said perforated floor, (g) The front end of said tubular air passageway forming a first opening that is substantially perpendicular to the plane of said perforated floor, (h) The sides and back end of said tubular air passageway being closed, (i) At least a portion of the bottom of said tubular air passageway forming a second opening that is substantially parallel to the plane of said perforated floor, (j) At least one flexible duct that is adapted to conduct air from said plenum chamber to a drying bin, each flexible duct having its upstream end connected to a plenum outlet, (k) The downstream end of each flexible duct being attached to the inlet end of a connector means, (l) The outlet end of said connector means being connected to the said first opening and said second opening of said tubular air passageway.

It is believed that the invention will now be better understood in specific terms by referring to the figures.

Figure 1:
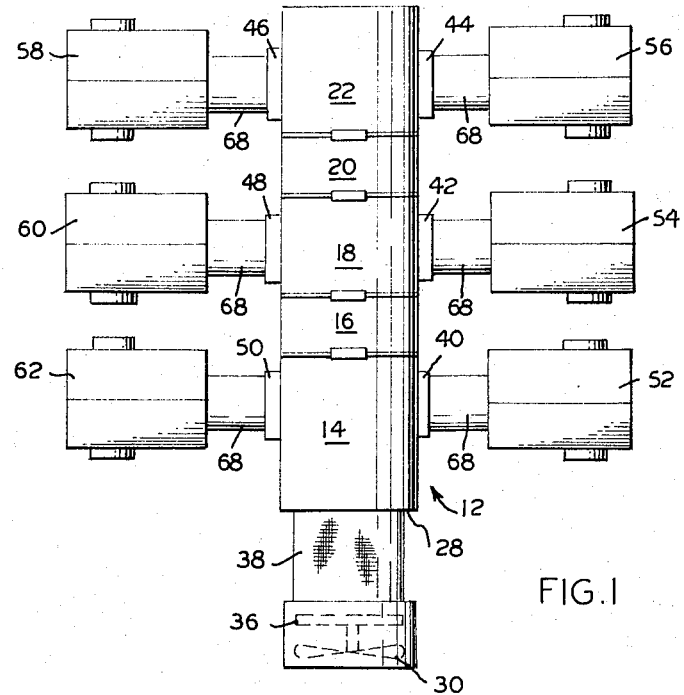
FIGURE 1 is a plan view of a main plenum chamber and a plurality of mobile bins or trailers hooked up to the plenum chamber ready for the drying operation.

FIGURE 1 shows a transportable drying system for drying corn or peanuts or other similar type crops which require dehydration before sale or storage. The system includes a main plenum chamber 12 consisting of a plurality of sections numbered 14, 16, 18, 20 and 22. The sections are secured together by a plurality of band members 24.

The main plenum chamber 12 has a generally cylindrical configuration and the individual sections can be hauled from place to place by means of a truck or trailer and may be easily removed from the trailer and placed in any desired location. (Instead of being cylindrical, the plenum chamber can be square or rectangular in cross section.)

The main plenum chamber 12 is usually closed at its downstream end 26 and has an inlet 28 at its upstream other end for the introduction of heated air. (The various means for producing heated air are well known and will not be repeated here.) Adjacent the main plenum chamber 12 is a fan 30 enclosed in a housing 32, the housing 32 being positioned so that the operation of the fan 30 will direct air toward the inlet 28 of the main plenum chamber 12. Inside the housing 32, positioned between the fan 30 and an end 34 of the housing 32, is a heating unit 36. Connecting the end 34 of the housing 32 and the inlet 28 of the plenum chamber 12 is a flexible (e.g. canvas) connector duct 38 which acts to minimize vibration in the plenum system when the fan is in operation. When the fan 30 and the heating unit 36 are operating, heated air is blown through the connector duct 38, through the inlet 28 and into the interior of the main plenum chamber 12.

The main plenum chamber 12 has a plurality of plenum outlets 40, 42, 44, 46, 48 and 50 at spaced intervals on the exterior surface of the plenum sections 14, 18 and 22. (Sections 16 and 20 merely serve to connect sections 14, 18 and 22, and have no outlet in them.) The plenum outlets are therefore laterally spaced a section apart and on opposing sides of the plenum chamber 12. Specifically, plenum outlets 40 and 50 are spaced on opposite sides of section 14 while section 16 has no plenum outlets at all. Likewise plenum outlets 42 and 48 are spaced on opposite sides of section 18 (section 20 has no outlets) and plenum outlets 44 and 46 are spaced on opposite sides of section 22. Thus in the embodiment shown there are six plenum outlets, three being disposed on each side of the plenum chamber 12. It is obvious that the main plenum chamber may contain a greater or lesser number of sections.

Figure 2:
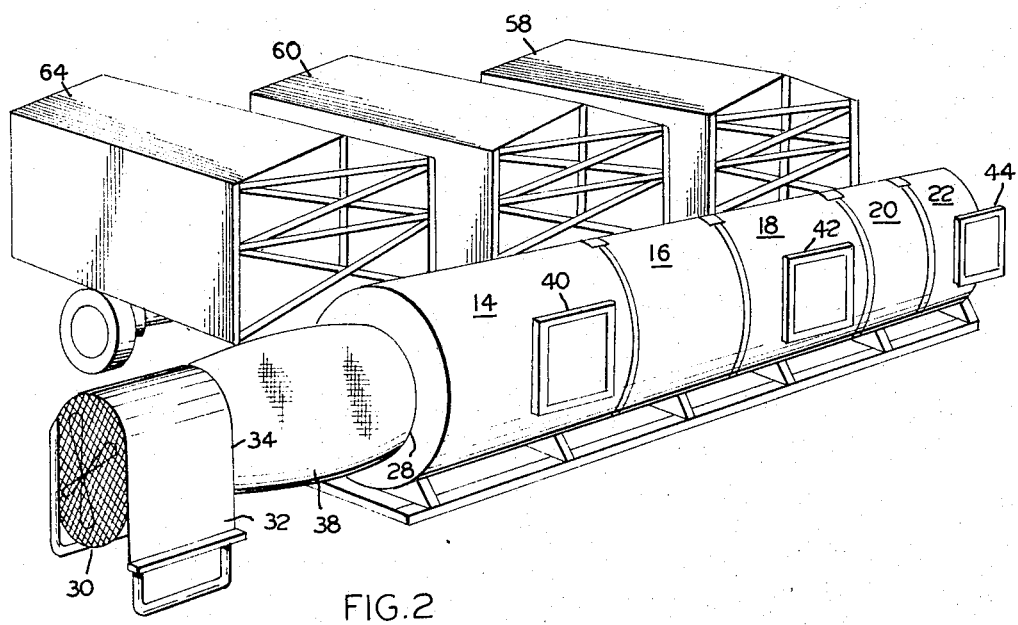
FIGURE 2 is a perspective view of a transportable dryer system similar to that of FIGURE 1 showing the further details of the plenum chamber and drying bins.

As shown in FIGURE 1 there are a plurality of mobile drying bins 52, 54, 56, 58, 60 and 62 positioned adjacent respective outlets 40, 42, 44, 46, 48 and 50 of the main plenum chamber 12. The mobile drying bins may consist of any trailer or truck-type vehicle having mounted thereon a bin for containing the crop to be dried. Each drying bin has a rear air inlet chamber and a perforated floor 63 (see FIGURE 7) side walls and a top 64 (see FIGURE 2) which provides an exit for the gases passing upwardly through the bin. Located beneath the perforated floor 206 is a tubular air passageway for heated air which preferably extends along the bottom central portion of the bin. The equipment described thus far is old in the art and in commercial use today and accordingly a more precise description does not appear necessary here.

The particular tubular air passageway that is used in this invention beneath the drying bin is different from prior passageways in several respects and a rather specific showing thereof is presented in FIGURE 7. In this figure the tubular air passageway is seen to be located immediately below the floor 200 of the drying bin (which is shown as having a front wall 202 and a side wall 204). The floor of the drying bin actually consists of a central perforated (or screen) section 206 and lateral non-perforated sections 208 and 210. (The perforated floor section may comprise between 30 and 95% of the entire floor area.) The tubular air passageway for the drying bin as shown in FIGURE 7 has first opening which is disposed in an essentially vertical plan (i.e., the opening bounded by members 212, 214, 216 and a portion of floor 200) and also a second opening which is disposed in an essentially horizontal plane (i.e. bounded by members 218, 220, 212 and 222) and which is substantially parallel to the plane of the perforated floor. It will be seen that tubular air passageway is substantially in the form of a tube of rectangular cross section having two inlet openings at one end, and an outlet opening to the drying bin consisting of the perforated floor 206 along one entire side (the sides 222 and 224 and the portion 226 that is back of member 223 being formed of sheet metal or the like). The two inlet openings of the tubular air passageway are designed to receive air from the plenum chamber 12 and distribute it upwardly through the drying bin as quickly and efficiently as possible.

The tubular air passageway that is located below the drying bin is preferably arranged so that its lowermost members (e.g. members 212, 218, 220 and 222) are not less than about ten inches above the ground (this distance being indicated by arrow A in FIGURE 3). A ten inch clearance is preferably provided so that the lower end of the tubular air passageway will not come in contact with or scrape along the ground when the bin is being transported over bumpy roads or through a farmer's field. However if one wishes to risk difficulties with bumpy roads, the clearance can be less than 10 inches.

Connecting the plenum outlets 40, 42, 44, 46, 48 and 50 of the main plenum chamber 12 and the tubular air passageway of each of the drying bins 52, 54, 56, 58, 60 and 62 are flexible ducts 68 made of canvas or some other similar material. The flexible ducts 68 are made of some flexible material so that the plenum chamber 12 and the drying bins 52, 54, 56, 58, 60 and 62 can be connected together rather easily even when the entire drying system is located on rough and irregular ground.

The end of the flexible duct 68 which is to be connected to the drying bin 52 is provided with a connector means which provides a novel and useful way for connecting the canvas duct 68 to the tubular air passageway beneath each drying bin. The purpose of the connecter means 70 is to facilitate the making of a quick connection between the duct 68 and the tubular air passageway of each drying bin and also allows an increased volume of air to flow from the main plenum chamber 12 into each drying bin.

The connector means is shown in detail in FIGURES 3, 4 and 5. Referring to FIGURES 4 and 5 it is seen to generally consist of an essentially open rigid rectangular framework which is secured to the open end of the flexible duct 68 by bolts, nails or equivalent fastening means. The inlet end of the connector means preferably always stays connected to the outlet end of the flexible duct 68. As seen in FIGURE 4 this framework consists of side members 73 and 75, top member 74 and bottom member 77. When the arrangement shown in FIGURE 4 is joined to the tubular air passageway shown in FIGURE 7, member 74 will abut against a portion of the back edge of floor 200; a portion of member 75 will abut against member 216; and a portion of member 73 will abut against member 214. The members just described can be held in abutting relationship by any suitable fastening means. A very simple fastening means in the form of a notched hook 104 is shown in the drawings in order to simplify the drawings, but it will be appreciated that any fastening means can be used which will press the members into tight abutting relationship (it is preferred that the fastening means be spring loaded or lever tensioned so that the abutting members will be pressed together in a fashion to minimize the leakage of gas.

Referring again to FIGURE 4, it will be seen that the connector means comprises (in addition to the rectangular framework 73, 74, 75, 77 described above) a section made largely of metal sheets 71, 72, 78 and 94 (which are joined to the bottom of the framework 73, 74, 75, 77 by bolts or other fastening means) and which extends outwardly therefrom. More particularly this section comprises two triangularly shaped side members 71 and 72 which are spanned by a generally rectangular bottom member 94 and an end member 78. The purpose of this section is to provide a sealed air flow-way to the portion of the tubular air passageway that is disposed in a horizontal plane. In other words, when the lower section of the connector means is in place, the upper edge of 72 will abut member 218; the upper edge of 71 will abut member 220 and the upper edge of member 78 will abut member 222. The members just described can be held in abutting relationship by any suitable fastening means. A very simple fastening means in the form of a notched hook 110 is shown in the drawings in order to simplify the drawings, but it will be appreciated that any fastening means can be used which will press the members into tight abutting relationship (it is preferred that the fastening means be spring loaded or lever tensioned so that the abutting members will be pressed together in a fashion to minimize the leakage of gas. The flexible duct and the inlet air channel of the drying bin are shown joined by the connector means and in abutting relationship in FIGURE 3.

Since some persons might find that the connector means is a little too bulky and heavy to easily manipulate into abutting relationship with the tubular air passageway, the present invention includes a very useful built-in lift mechanism to assist in the movement of the connector means.

Referring to FIGURE 4 it will be noticed that a rod member 99 is fixed between the two side walls 71 and 72 and connected to rod members 99 are two springs that have hooks 102 on their upper ends.

Referring to FIGURE 7 it will be seen that a shaft 116 is rotatably mounted between side walls 222 and 224 of the air inlet channel. The portion of shaft 116 that passes through wall 222 is provided with a crank handle 112 which can be turned to rotate the shaft. Two cables 118 having loops 120 on the ends thereof are attached to the shaft at spaced apart intervals. A ratchet wheel 114 is also provided on shaft 116 and adjacent the ratchet wheel 114 is a dog 118 which holds the position of the winch when the crank handle 112 is rotated. This essentially comprises a winch system.

With the above winch system an individual is able to position the canvas duct 68 and attached connector means in proper positional relationship with respect to the inlet portion of the tubular air passageway with a minimum of effort. To accomplish this, the loops 120 are connected to their respective hooks 102 and the crank handle 112 is then rotated. As the handle 112 is rotated the shaft 116 turns and the cables 118 are wound onto the turning shaft 116, thus raising the flexible duct 68 and attached connector means into proper air-tight relationship with the tubular air passageway of the drying bin 52. The springs 100 associated with the hooks 102 are desirable so that as the winch system is operated it will uniformly and evenly bring the duct 68 and connector means 70 into proper position. Without these resilient spring hooks 102 the connector means might not come into position properly and could move into position in a lop-sided manner. Or in other words, the resilient spring hook compensates for small differences in size and for changes that may occur in the equipment from time to time.

As shown in FIGURE 3, once the winch system has been operated so as to move the flexible duct 68 and the connector means into their proper position with respect to the tubular air passageway of the drying bin 52, the fastening means 104 and 110 can be locked into place. The fastening means 104 and 110 thus retain the flexible duct 68 and connector means in an air-tight relationship with the tubular air passageway of the drying bin 52. With the present novel connector means the maximum volume of heated air is allowed to pass into the drying bin 52.

FIGURE 5 shows a modification of FIGURE 4 wherein the springs 100 are anchored to brackets 105 on the side walls 71 and 72. This eliminates the need for bar 99 shown in FIGURE 4.

Another novel feature of the drying system is illustarted in FIGURE 6 which shows an enlarged frontal view of a plenum outlet on the main plenum 12. The plenum outlet is defined by the rectangular framework of members 51, 53, 55 and 57 is provided with a damper 80 which may be opened to varying posiions so as to control the amount of air flowing from the main plenum chamber 12 into the flexible ducts (68). The damper 80 is mounted on a rotatable shaft 86 that is rotatably mounted between members 53 and 57. One end of the shaft 86 is provided with a handle 82. Affixed to the handle 82 is an arm 88 provided with a plurality of holes. A projecting bar 92 is provided near the lower end of member 57 which is also provided with one or more holes. With this construction the handle 82 (and thereby the damper 80) can be locked in any desired position by merely placing a pin or bolt through aligned holes in members 92 and 88. By thus varying the position of the damper 80 the amount of air flowing out of each plenum outlet can be independently varied very easily and very quickly.

The novel drying appaartus of this invention permits the drying operation to be completed about 20–25% faster than when using similar equipment (having the same plenum size and same drying bin volumes. This difference is of considerable importance to peanut farmers and peanut drying contractors.

In conclusion, while there has been illustrated and described some preferred embodiments of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims. Having thus described our invention, what we claim as new and desire to secure by United States Letters Patent is:

1. A transportable drying system for peanuts and other crops which comprises:
    (a) a main plenum chamber,
    (b) said main plenum chamber having an inlet for introducing air under pressure,
    (c) said main plenum chamber also having a plurality of plenum outlets for air,
    (d) at least one mobile drying bin positioned adjacent to at least one of said plenum outlets, each said drying bin having a floor that is at least partially perforated,
    (e) each drying bin having a generally tubular air passageway that is permanently located entirely beneath the perforated bottom of the drying bin,
    (f) the top of said tubular air passageway being in open communication with said perforated floor,
    (g) the front end of said tubular air passageway forming a first opening that is substantially perpendicular to the plane of said perforated floor,
    (h) the sides and back end of said tubular air passageway being closed,
    (i) at least a portion of the bottom of said tubular air passageway forming a second opening that is substantially parallel to the plane of said perforated floor,
    (j) at least one flexible duct that is adapted to conduct air from said plenum chamber to a drying bin, each flexible duct having its upstream end connected to a plenum outlet.
    (k) the downstream end of each flexible duct being attached to the inlet end of a connector means,
    (l) the outlet end of said connector means being connected to the said first opening and said second opening of said tubular air passageway, and
    (m) mechanical lifting means located below said drying bin which permits lifting and positioning of said connector means with respect to said tubular air passageway.

2. A transportable drying system as set forth in claim 1 wherein said drying bin is provided with a winch system for positioning said connector means with respect to the tubular air passageway of said drying bin.

3. A transportable drying system which comprises:
    (a) a main plenum chamber,
    (b) said main plenum chamber having an inlet for introducing air under pressure,
    (c) said main plenum chamber also having a plurality of plenum outlets for air,
    (d) at least one mobile drying bin positioned adjacent to at least one of said plenum outlets, each said drying bin having a floor that is at least partially perforated,
    (e) each drying bin having a generally tubular air passageway that is permanently located entirely beneath the perforated bottom of the drying bin,
    (f) the top of said tubular air passageway being in open communication with said perforated floor,
    (g) the front end of said tubular air passageway forming a first opening that is substantially perpendicular to the plane of said perforated floor,
    (h) the sides and back end of said tubular air passageway being closed,
    (i) at least a portion of the bottom of said tubular air passageway forming a second opening that is substantially parallel to the plane of said perforated floor, (j) at least one flexible duct that is adapted to conduct air from said plenum chamber to a drying bin, each flexible duct having its upstream end connected to a plenum outlet, (k) the downstream end of each flexible duct being attached to the inlet end of a connector means, (l) the outlet end of said connector means being connected to the said first opening and said second opening of said tubular air passageway.

4. A claim as set forth in claim 3 wherein said flexible duct is made of canvas.

5. A transportable drying system as set forth in claim 3 wherein said outlets of said main plenum chamber are each provided with a damper means and means for adjusting the damper means for controlling the flow of heated air out of said main plenum chamber.

References Cited

UNITED STATES PATENTS

| | | | |
|---|---|---|---|
| 469,877 | 3/1892 | Waugh | 110—71 |
| 642,856 | 2/1900 | Tabor | 254—48 |
| 1,646,111 | 10/1927 | Reid | 110—71 X |
| 2,442,344 | 6/1948 | Curtis | 34—233 |
| 2,661,544 | 12/1953 | Tanasse | 34—54 |
| 2,714,258 | 8/1955 | Smith et al. | 34—233 X |
| 2,714,259 | 8/1955 | Best et al. | 34—233 |
| 3,202,204 | 8/1965 | Jouard | 158—116 |

FOREIGN PATENTS 351,736  7/1931  Great Britain.

FREDERICK L. MATTESON, Jr., *Primary Examiner.*

C. R. REMKE, H. B. RAMEY, *Assistant Examiners.*